US012248447B2

(12) United States Patent
Eunice et al.

(10) Patent No.: US 12,248,447 B2
(45) Date of Patent: Mar. 11, 2025

(54) DATA QUALITY EVALUATION SYSTEM

(71) Applicant: CollectiveHealth, Inc., San Mateo, CA (US)

(72) Inventors: Kasey Eunice, Santa Rosa, CA (US); Roman Kisin, San Jose, CA (US)

(73) Assignee: CollectiveHealth, Inc., San Mateo, CA (US)

( * ) Notice: Subject to any disclaimer, the term of this patent is extended or adjusted under 35 U.S.C. 154(b) by 0 days.

(21) Appl. No.: 18/077,867

(22) Filed: Dec. 8, 2022

(65) Prior Publication Data
US 2024/0193137 A1    Jun. 13, 2024

(51) Int. Cl.
G06F 7/00       (2006.01)
G06F 16/215     (2019.01)
G06Q 40/08      (2012.01)

(52) U.S. Cl.
CPC .......... *G06F 16/215* (2019.01); *G06Q 40/08* (2013.01)

(58) Field of Classification Search
CPC .............................. G06F 16/215; G06Q 40/08
See application file for complete search history.

(56) References Cited

U.S. PATENT DOCUMENTS

| | | | | |
|---|---|---|---|---|
| 5,307,262 A * | 4/1994 | Ertel | ...................... | G16H 40/20 705/2 |
| 8,751,436 B2 * | 6/2014 | Lowry | ................... | G06Q 40/00 706/52 |
| 11,204,851 B1 * | 12/2021 | Iyengar | ................ | G06F 11/3006 |
| 2003/0172084 A1 * | 9/2003 | Holle | ...................... | G06Q 30/02 |
| 2005/0262190 A1 * | 11/2005 | Mamou | .................. | G06Q 10/10 709/203 |
| 2013/0055042 A1 * | 2/2013 | Al Za'noun | ..... | G06Q 10/06395 714/E11.023 |
| 2014/0279934 A1 * | 9/2014 | Li | .......................... | G06F 16/215 707/687 |
| 2015/0121280 A1 * | 4/2015 | Slatner | ................... | G06Q 10/10 707/769 |
| 2016/0098654 A1 * | 4/2016 | Bhattacharjee | .. | G06Q 10/06395 705/7.36 |
| 2016/0267082 A1 * | 9/2016 | Wong | ..................... | G06F 16/164 |
| 2017/0004413 A1 * | 1/2017 | Flores | ................. | G06F 16/2365 |
| 2017/0228675 A1 * | 8/2017 | Kisin | ................. | G06Q 10/0637 |
| 2020/0334680 A1 * | 10/2020 | Vanga | ................... | G06F 21/554 |
| 2020/0364561 A1 * | 11/2020 | Ananthanarayanan | ..................... | H04L 43/08 |
| 2021/0103580 A1 * | 4/2021 | Schierz | ............... | G06F 16/2365 |
| 2021/0248144 A1 * | 8/2021 | Haile | ...................... | H04L 43/16 |
| 2022/0328332 A1 * | 10/2022 | Murai | ............... | H01L 21/67276 |

(Continued)

*Primary Examiner* — Mohammed R Uddin
(74) *Attorney, Agent, or Firm* — Lee & Hayes, P.C.

(57) ABSTRACT

A data quality evaluation system can automatically detect one or more types of data anomalies or other data quality issues associated with a data processing system that may impact the quality of output generated by the data processing system. For example, the data quality evaluation system can detect data errors associated with data, detect when data is not received by the data processing system in compliance with defined schedules, detect when elements of the data processing system may be mishandling data, and/or detect when patterns of data does not correspond with historical patterns or validation data. By automatically detecting such data quality issues, technical issues or problems causing the data quality issues can be investigated and corrected.

20 Claims, 4 Drawing Sheets

(56) References Cited

U.S. PATENT DOCUMENTS

2022/0405261 A1* 12/2022 Ma ..................... G06F 16/2272
2023/0036186 A1* 2/2023 Blum ................... G06F 16/254
2023/0244191 A1* 8/2023 Honkote ............ G05B 13/0265
　　　　　　　　　　　　　　　　　　　　　　　　　　700/47
2023/0346253 A1* 11/2023 Inan ...................... G16H 50/30

* cited by examiner

DATA QUALITY EVALUATION SYSTEM

TECHNICAL FIELD

The present disclosure relates to evaluating the quality of data being received and/or processed by a data processing system, and more particularly to detecting anomalies and other issues with the data that may impact the quality of output generated by the data processing system based on the data.

BACKGROUND

A data processing system can receive various types of data from multiple sources. For example, the data processing system can use one or more Application Programming Interfaces (APIs), data retrieval systems, and/or other channels to request and/or receive data from sources. In some examples, data from different sources can be provided via different channels, at different times, and/or in other ways that may vary from source to source.

The data processing system can also process received data in various ways, and generate corresponding output based on the processing of the received data. In some examples, the data processing system can generate new data during the processing of the received data, and generate output based on the received data and/or new data generated from the received data. For example, the output can be reports indicating results of the data processing, summaries of the data, aggregated data, and/or other types of output.

As an example, the data processing system can be associated with a benefit plan administrator that manages a benefit plan on behalf of an employer or other sponsor. The data processing system can receive data from various partners and other sources, such as claims associated with the benefit plan that have been submitted by medical providers and other entities. The data processing system can process the data in one or more ways, for instance to adjudicate submitted claims. The data processing system can also generate one or more types of output based on the received data and/or data generated during the processing of the received data. For instance, the data processing system can generate a report for a sponsor of a benefit plan that indicates how many claims were submitted in association with the benefit plan during a month, types of claims that were submitted, which plan participants were associated with the claims, results of corresponding claim adjudications, and/or any other metrics or information.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
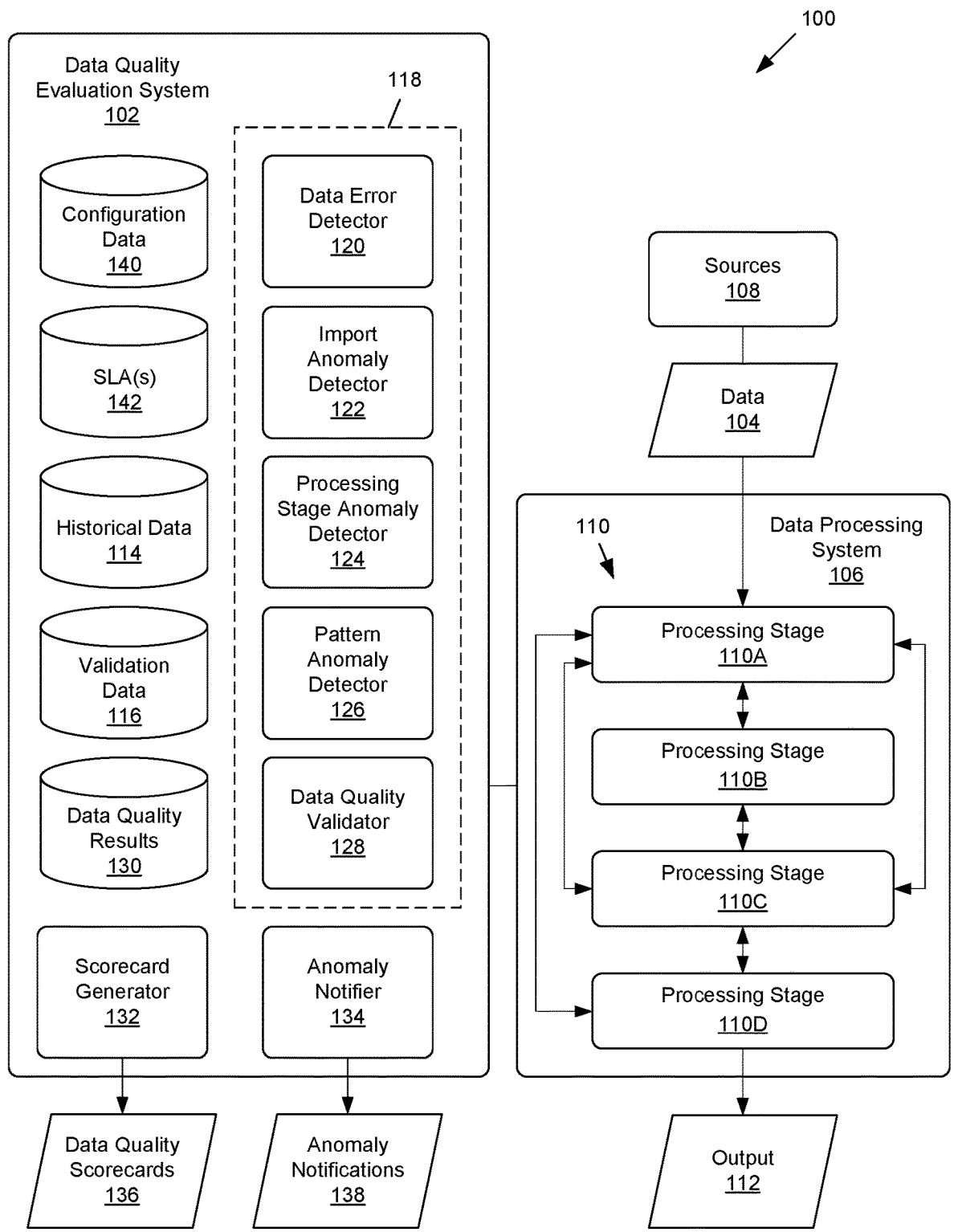
FIG. 1 shows an example of a data quality evaluation system configured to evaluate the quality of data received by, and/or processed by, a data processing system.

A data processing system can be configured to receive data from a variety of sources. For example, data can be claim information associated with a benefit plan that is submitted to the data processing system by medical providers and/or other sources. The data processing system can also be configured to process the received data in one or more ways, and generate output based on the received data and/or the processing of the data in the data processing system.

For example, if the data provided to the data processing system includes claims information, the data processing system may be configured to aggregate or summarize claim information associated with a set of claims, adjudicate individual claims, and/or otherwise process the claims information. In this example, the data processing system can also generate output, such as reports indicating the aggregated or summarized claim information, results of claim adjudication decisions, and/or other information associated with the originally-received claims information and/or how the data processing system processed the claims information.

However, data anomalies and other data quality issues may impact the quality of the output produced by the data processing system. For example, if sources of the data do not provided data by expected times, or provide less than an expected amount of data, the output generated by the data processing system based on that data can be inaccurate or incomplete. As another example, if certain instances of data are mishandled by one or more elements of the data processing system itself, the output generated by the data processing system based on that data can also be inaccurate or incomplete.

In some conventional systems, it may not be apparent to an operator of a data processing system that incoming data, and/or data being processed by the data processing system, may be incomplete, include errors, and/or be associated with other data quality issues. Accordingly, the operator may not be aware that the data, from which reports or other output are generated by the data processing system, may be associated with data quality issues that may impact the quality of the output of the data processing system. For example, if the data processing system receives data from numerous sources, it may not be apparent when a single source begins providing less than an expected amount of data. Accordingly, it may not be apparent that output generated by the data processing system in association with data provided by that single source may be inaccurate or incomplete.

Described herein is a data quality evaluation system configured to automatically evaluate the quality of data received by and/or processed by a data processing system. For example, the data quality evaluation system can detect data anomalies and other data quality issues associated with data received by the data processing system from one or more sources, and/or with data processed by the data processing system. The data quality evaluation system can detect such data anomalies and other data quality issues more quickly than conventional systems, such that technical issues or other problems that may be causing the data quality issues can be investigated and corrected more quickly.

FIG. 1 shows an example 100 of a data quality evaluation system 102 that is configured to evaluate the quality of data 104 received by, and/or processed by, a data processing system 106. The data quality evaluation system 102 and/or the data processing system 106 can execute via one or more computing systems, as discussed further below. The data processing system 106 can be configured to receive data 104 from one or more sources 108, process the data 104 in one or more processing stages 110, and generate output 112 based on the processing of the data 104 by the processing stages 110. For example, the output 112 can include one or more types of reports that summarize the data 104 and/or indicate how the data 104 was processed by the data processing system 106. The output 112 can be used by an entity that operates the data processing system 106, and/or be provided to one or more external entities.

If the data 104 received from the sources 108, and/or that is output by and passed between the processing stages 110, is associated with data quality issues such as incomplete, anomalous, or erroneous data, the final output 112 generated via the data processing system 106 based on that data 104 may be incomplete or contain errors. However, the data quality evaluation system 102 can automatically detect data quality issues, such as incomplete data, data anomalies, errors, and/or other issues that may impact the quality of the output 112 generated based on the data 104. For example, the data quality evaluation system 102 can determine that data 104 received from one or more sources 108 is late, incomplete, and/or invalid, determine that data 104 has been held up or mishandled by one or more processing stages 110, identify data 104 being processed that is anomalous relative to trends or patterns indicated by historical data 114, detect anomalous data 104 that does not match validation data 116 received from one or more validation sources, and/or identify other types of data anomalies or data quality issues.

The data quality evaluation system 102 can automatically detect data quality issues, such that technical issues or other problems with the sources 108 and/or the data processing system 106 that may be causing the data quality issues can be investigated and/or corrected. As an example, if an API or other channel that a source uses to submit data 104 to the data processing system 106 is misconfigured or is experiencing other technical issues, the source may be unable to provide data 104 to the data processing system 106 as expected. The data quality evaluation system 102 can determine that the expected data is not being received from the source, and technical issues with the API or other channel that had been preventing data 104 from the source from reaching the data processing system 106 can be investigated and fixed.

As discussed above, the data processing system 106 can receive data 104 from one or more sources 108, and process the data 104 to generate output 112. The data processing system 106 can receive data 104 from sources 108 via one or more APIs and/or other channels. The sources 108 can separately provide individual instances of data 104, can provide batches or other collections of data 104, can provide data 104 in different formats, at different times, and/or via different channels, and/or otherwise provide data 104 to the data processing system 106. For example, a source can use an API or other channel to submit data 104 to the data processing system 106 via a network.

The data processing system 106 can include a set of one or more processing stages 110 that receive and/or process data 104. For example, the data processing system 106 can include processing stage 110A, processing stage 110B, processing stage 110B, and processing stage 110D, as shown in FIG. 1. Although four processing stages 110 are present in the example 100 shown in FIG. 1, in other examples the data processing system 106 may have one processing stage, two processing stages 110, three processing stages 110, five processing stages 110, or any larger number of processing stages 110.

In some examples, one of the processing stages 110 of the data processing system 106, such as processing stage 110A shown in FIG. 1, may be a File Transfer Protocol (FTP) server to which data 104 can be transferred by sources 108, a web page or mobile application with a user interface allowing users to upload data 104, or any other API, interface, system, or channel through which an external source can submit data 104 to the data processing system 106. In other examples, a processing stage or other element of the data processing system 106 can be configured to request or retrieve instances of data 104 from sources 108. For example, a source can store data 104 in a source database or FTP server, and a processing stage of the data processing system 106 can use an API, an HTTP GET request, or another data retrieval technique or channel to retrieve the data 104 from the source database or FTP server.

Different processing stages 110 may be configured to process data 104 in different ways. For example, a particular processing stage in the data processing system 106 may receive data 104 from one or more sources 108, and/or from one or more other processing stages 110. The processing stage may also edit the data 104, transform the data 104, combine data 104, generate new data 104, and/or otherwise process or operate on the data 104. In some examples, one or more processing stages 110 may automatically process data 104. In other examples, one or more processing stages 110 other processing stages 110 may also and/or alternately involve manual processing and/or evaluation of data 104. Data 104 generated and/or output by one processing stage can be used as input by one or more other processing stages, and/or be used as output 112 or be used to generate output 112. For example, a final processing stage can generate output 112, such as a report, that indicates how a collection of data 104 was processed by other processing stages 110 of the data processing system 106, indicates a summary and/or metrics associated with the processed collection of data 104, and/or other information associated with the collection of data 104, as discussed further below.

In some examples, the processing stages 110 can be arranged in a sequential order in the data processing system 106. For instance, the processing stages 110 can be arranged in order in a pipeline, such that instances of data 104 can pass through each of the processing stages 110 in the pipeline in order, and data 104 operated on and/or generated by one processing stage can be provided as input to the next processing stage in the pipeline. In other examples, however, different instances of data 104 can be routed to different processing stages 110 and/or in different orders. For instance, a determination made at processing stage 110A in association with a first instance of data 104 may cause the first instance of data 104 to be routed from processing stage 110A to processing stage 110B. However, another determination made at processing stage 110A in association with a second instance of data 104 may cause the second instance of data 104 to be routed from processing stage 110A to processing stage 110C, instead of processing stage 110B.

As a non-limiting example of how data 104 can be received and processed by the data processing system 106, the data processing system 106 can be associated with a benefit plan administrator that manages benefit plans. In this example, the data processing system 106 can receive instances of data 104 associated with benefit plans from one or more sources 108, and use the data 104 to generate reports and/or other types of output 112 associated with the benefit plans. A benefit plan can be a plan or policy that provides participants of the benefit plan with one or more benefits or services, such as medical benefits, pharmacy benefits, dental benefits, vision benefits, and/or other types of healthcare or non-healthcare benefits. As an example, a benefit plan can be, or include, a health plan that provides participants with benefits including coverage of one or more medical services. In other examples, a benefit plan can be, or include, a travel plan that offers various travel benefits, a real-estate lease, an investment portfolio plan, an employee perks or assistance plan, and/or any other type of benefit plan or policy.

In some examples, a benefit plan administrator associated with the data processing system 106 can administer benefit plans on behalf of sponsors. For instance, a sponsor can be an employer that offers a benefit plan to its employees, and the benefit plan administrator can be a third-party entity that provides documentation about the benefit plan to participants and potential participants of the benefit plan, adjudicates claims associated with the benefit plan, and/or otherwise manages the benefit plan on behalf of the sponsor employer. In other examples, the sponsor can be an insurance company or any other entity that offers a benefit plan, but uses the benefit plan administrator associated with the data processing system 106 to manage the benefit plan. In still other examples, the benefit plan administrator can itself be an insurance company or other entity that directly offers a benefit plan.

In examples in which the data processing system 106 is associated with a benefit plan administrator, the sources 108 can be partners of the benefit plan administrator, medical providers, pharmacies, insurers, insurance networks, other networks, clearinghouses, benefit plan participants, sponsors, and/or other entities. The data 104 provided by such sources 108 can be associated with participants of benefit plans, such as claims information, invoices, information about services that have been rendered for participants, and/or other types of information. For example, the data 104 can include claims information submitted by various parties against a benefit plan to track usage of benefits, to have the benefit plan administrator determine whether a provided service is covered by the benefit plan, to have the benefit plan administrator determine a cost sharing arrangement between parties for a provided service, to request reimbursement of costs paid by plan participants to obtain services, and/or for other reasons.

Additionally, in examples in which the data processing system 106 is associated with a benefit plan administrator, the data processing system 106 can generate output 112 associated with benefit plans. For example, if the data 104 includes claims information associated with a benefit plan managed by the benefit plan administrator on behalf of a sponsor, one or more processing stages 110 of the data processing system 106 may adjudicate and/or otherwise process the received claims information, and generate corresponding output 112 for the sponsor. For example, the output 112 can include one or more reports indicating how many claims were submitted in a month or other period of time in association with the benefit plan, which and/or how many entities submitted the claims, which and/or how many plan participants were associated with the claims, how many of the claims were approved and/or denied, dollar amounts associated with the claims and/or individual types of claims, and/or any other type of report associated with the claims. Such reports associated with benefit plans can be provided by the benefit plan administrator to the sponsors of the benefit plans.

The data processing system 106 associated with a benefit plan administrator in these examples can have a pipeline of processing stages 110, as discussed above. For instance, in the example 100 shown in FIG. 1, the first processing stage 110A can be configured to obtain data 104, such as claims files, from one or more sources 108. The second processing stage 110B can be a claim adjudication system that adjudicates claims automatically and/or based on input from human claims adjustors. The third processing stage 110C can be a billing and/or payment stage that issues bills and/or makes payments based on adjudication of claims in the second processing stage 110B. The fourth processing stage 110D can be a report generation stage that generates, as output 112, reports associated with the received and/or adjudicated claims. However, the pipeline can include fewer and/or different processing stages 110 as discussed above, and/or individual processing stages 110 can include sub-stages, other pipelines, and/or other components or systems. Individual processing stages 110 can also process other types of data 104 instead of, or in addition to, claims data, such as participant eligibility data, billing data, partner usage files, or any other type of data.

Although in some examples the data processing system 106 can be associated with a benefit plan administrator as described above, in other examples the data processing system 106 can be associated with any other entity that receives data 104 from one or more sources 108, processes the data 104 with the data processing system 106, and generates corresponding output 112 based on the processing of the data 104. As an example, the data processing system 106 can be associated with a financial services company that receives financial data from a set of banks and/or other sources 108, and that processes the received financial data to generate corresponding monthly financial reports and/or other types of output 112. As another example, the data processing system 106 can be associated with a weather forecasting system that receives weather data measurements from a set of weather stations and/or other sources 108, and that uses the received weather data measurements as input to a weather prediction model to generate corresponding weather forecasts and/or other types of output 112. As yet another example, the data processing system 106 can be associated with a website that receives various types of content data from a set of sources 108, and that processes and/or aggregates the received content data to generate corresponding output 112 to be displayed via one or more web pages of the website.

As described above, because the output 112 of the data processing system 106 can be based at least in part on the data 104 received from one or more sources 108, and/or based on data 104 processed and/or output by one or more processing stages 110 of the data processing system 106, any anomalies or other quality issues with the data 104 received from the sources 108 and processed by the processing stages 110 can impact the quality of the corresponding output 112 that is generated based on that data 104. For example, if the data processing system 106 is associated with a benefit plan administrator, and claims data associated with a benefit plan for a sponsor is not received from a particular source by an expected time, reports for that sponsor that are generated as output 112 may not accurately indicate an actual number of claims associated with that particular source that should have been submitted by the expected time. As another example, if processing of some claims data is stalled at a particular processing stage due to errors in initially-received claims data and/or corresponding data output by a preceding processing stage in a pipeline, and a team that generates a report as output 112 is unaware that the claims data is stalled in the pipeline, the generated report may indicate inaccurate metrics associated with processing of an overall set of claims data. However, the data quality evaluation system 102 can automatically detect these and other types of data quality issues that may impact the quality of the output 112, such that technical issues and other problems with sources 108 and/or within the data processing system 104 that are associated with detected data quality issues can be investigated and/or fixed.

The data quality evaluation system 102 can have a set of data quality evaluators 118 configured to automatically detect one or more types of data quality issues associated with the data 104 received by the data processing system 106 and/or processed by one or more processing stages 110. The data quality evaluators 118 can include one or more of a data error detector 120, an import anomaly detector 122, a processing stage anomaly detector 124, a pattern anomaly detector 126, or a data quality validator 128. The different data quality evaluators 118 can evaluate the data 104 in different ways, as discussed further below, and can generate corresponding data quality results 130. The data quality results 130 generated by the data quality evaluators 118 can be stored in a database or other data repository.

The data quality evaluation system 102 can also have a scorecard generator 132 and/or an anomaly notifier 134. The scorecard generator 132 can evaluate data quality results 130, determined by one or more of the data quality evaluators 118, to determine one or more types of metrics associated with the data quality results 130. The scorecard generator 132 can generate corresponding data quality scorecards 136 that indicate the metrics derived from the data quality results 130, as described further below. The anomaly notifier 134 can generate anomaly notifications 138 based on the data quality results 130. The anomaly notifications 138 can indicate specific issues, indicated by the data quality results 130, with data 104 provided by one or more sources 108 and/or with data 104 being processed by one or more processing stages 110, as described further below.

The data quality evaluation system 102 can also have configuration data 140 that can specify settings, parameters, and/or other data that impacts the operations of the data quality evaluators 118, the scorecard generator 132, the anomaly notifier 134, and/or other elements of the data quality evaluation system 102. For example, the configuration data 140 can indicate which of the data quality evaluators 118 to execute, when to execute those data quality evaluators 118, types of data 104 to be analyzed by the data quality evaluators 118, types of queries or other operations to be executed by the data quality evaluators 118, thresholds to be used by the data quality evaluators 118, the scorecard generator 132, the anomaly notifier 134, and/or other elements of the data quality evaluation system 102, and/or other settings or parameters associated with elements of the data quality evaluation system 102.

The data error detector 120 can be configured to detect errors in data 104 received from sources 108, and/or being processed or passed between processing stages 110. For example, the data error detector 120 can detect whether instances of data 104 include empty fields, null values, invalid values, incorrect data types, and/or other issues that may make the data 104 at least partially unusable or uninterpretable in the data processing system 106. As an example, configuration data 140 or other information may indicate that a "name" field of submitted claims data is a required field. The data error detector 120 can accordingly determine that if the "name" field of a particular instance of claim data is blank, the particular instance of claim data contains an error. As another example, submitted claims data can include International Classification of Diseases (ICD) codes, such as ICD-10 codes that indicate corresponding diagnoses. In this example, the quality detector 120 can determine whether claims data includes invalid ICD-10 codes, and thus includes errors. As yet another example, the configuration data 140 may indicate a valid range of values for a particular type of field, and the quality detector 120 can determine whether values of that field in instances of data 104 are outside the valid range and thereby include errors.

If the data error detector 120 detects an error associated with an instance of data 104, the data error detector 120 can generate data quality results 130 associated with the error and/or the instance of data 104. For instance, the data quality results 130 can include an identifier of the instance of data 104, an identifier of the source that provided the instance of data 104, an identifier of a processing stage that last processed the instance of data 104 and/or generated the data 104, an identifier of the type of error associated with the data 104, and/or other information associated with the error and/or the instance of data 104.

As an example, if a particular source provides data 104 that includes invalid values in a particular field, the data error detector 120 can generate data quality results 130 that identify the particular source and the particular field. Accordingly, based on these data quality results 130, the particular source can be informed that the data 104 it has been providing to the data processing system 106 includes errors associated with the identified field, and the particular source may be able to correct issues causing those errors such that subsequent data 104 from the particular source no longer includes those errors.

As another example, a particular processing stage of the data processing system 106 may be configured to operate on data 104 received from a source and/or a preceding processing stage, and output corresponding data 104 to a subsequent processing stage. If the particular processing stage is misconfigured, has a software bug, or has another issue, the data 104 output by the particular processing stage may contain missing and/or invalid values that can be detected by the data error detector 120. The data error detector 120 can generate data quality results 130 that identify the particular processing stage that output the data 104 with the missing and/or invalid values, and/or other information associated with the missing and/or invalid values. Accordingly, based on these data quality results 130, issues with the particular processing stage that may be causing the missing and/or invalid values in data 104 output by the particular processing stage can be investigated and/or corrected.

Although the data error detector 120 can generate data quality results 130 if the data error detector 120 detects an error associated with an instance of data 104 as described above, in some examples the data error detector 120 can also generate data quality results 130 when the data error detector 120 does not detect errors associated with instances of data 104. For example, if the data error detector 120 evaluates an instance of data 104 and does not detect any errors associated with the instance of data 104, the data error detector 120 can generate data quality results 130 indicating that no errors with the instance of data 104 were found by the data error detector 120. Accordingly, the data quality results 130 may indicate which specific instances of data 104 had errors detected by the data error detector 120, counts or percentages of instances of data 104 that did and/or did not have errors detected by the data error detector 120, and/or other metrics or information based on detection of errors in the data 104 by the data error detector 120.

The import anomaly detector 122 can be configured to detect data anomalies and/or other data quality issues associated with data 104 received and/or expected from sources 108, based on service level agreements (SLAs) 142 associated with corresponding sources 108. Information about the SLAs 142 can be indicated by the configuration data 140 of the data quality evaluation system 102, or can be stored separately by the data quality evaluation system 102.

The SLAs 142 may define when particular sources 108 are to provide data 104 to the data processing system 106, what formats the sources 108 are to use to provide data 104 to the data processing system 106, what channels the sources 108 are to use to provide data 104 to the data processing system 106, what types of data 104 the sources 108 are to provide to the data processing system 106, and/or other expectations or requirements associated with data 104 the sources 108 are to provide to the data processing system 106. Accordingly, the import anomaly detector 122 can determine whether individual sources 108 have provided data 104 of the types and/or formats defined in corresponding SLAs 142, determine whether individual sources 108 have provided data 104 by times defined in corresponding SLAs 142, and/or otherwise determine if individual sources 108 have provided data 104 in compliance with other expectations or requirements defined in corresponding SLAs 142.

As a non-limiting example, if the data processing system 106 is associated with a benefit plan administrator, the sources 108 can be partners of the benefit plan administrator that have promised in SLAs 140 to provide certain types of data 104 to the data processing system 106 by certain times. For instance, a first partner of the benefit plan administrator can be a dental insurance network that has promised in a first SLA to provide a set of dental claims to the data processing system 106 each weekday by 9 AM, while a second partner can be a hospital network that has promised in a second SLA to provide a set of medical claims to the data processing system 106 every other day by 3 PM. In this example, the import anomaly detector 122 can accordingly determine, based on the first SLA, whether the dental insurance network provided dental claims by 9 AM on a particular day, whether the dental insurance network was late and provided dental claims after the 9 AM deadline on a particular day, or whether the dental insurance network did not provide any dental claims on a particular day. The import anomaly detector 122 can similarly use the second SLA to determine whether or not the hospital network provides a set of medical claims by the 3 PM deadline every other day.

In some examples, the import anomaly detector 122 can execute on schedules defined by the configuration data 140 and/or the SLAs 142. For instance, if a particular SLA indicates that data 104 is expected from a particular source by particular days and/or particular times, the import anomaly detector 122 can execute at or after those particular days and/or times to determine whether or not the expected data 104 has been received from the particular source. The import anomaly detector 122 may execute at different days and/or times indicated by a different SLA for a different source, to determine whether or not expected data 104 has been received from the different source has been received. In other examples, the import anomaly detector 122 can execute once per day, or on any other schedule defined in the configuration data 140, for instance to determine whether or not data 104 expected from one or more sources 108 according to corresponding SLAs 142 has been received in compliance with the SLAs 142 since the last time the import anomaly detector 122 executed.

If the import anomaly detector 122 determines that a source has not provided data 104 to the data processing system 106 in compliance with a corresponding SLA, the import anomaly detector 122 can generate data quality results 130 associated with the source and/or the SLA. The data quality results 130 can, for instance, include an identifier of the source, an identifier of the SLA, and/or indications of aspects of the SLA that the source has not complied with. For example, the data quality results 130 can indicate that a source provided expected data 104 after a deadline defined in an SLA, or did not provide expected data 104 at all. Accordingly, based on these data quality results 130, the source can be informed that it is not providing data 104 to the data processing system 106 in compliance with the SLA, and the source may be able to correct technical issues or other problems that had been preventing compliance with the SLA such that the source can comply with the SLA in the future.

Although the import anomaly detector 122 can generate data quality results 130 if the import anomaly detector 122 determines that a source has not provided data 104 in compliance with a corresponding SLA as described above, in some examples the import anomaly detector 122 can also generate data quality results 130 when the import anomaly detector 122 determines that sources 108 have provided data 104 in compliance with corresponding SLAs 142. For example, if the import anomaly detector 122 determines that a batch of data 104 has been received from a particular source by a day and time defined in an SLA, the import anomaly detector 122 can generate data quality results 130 indicating that the particular source complied with the SLA. Accordingly, the data quality results 130 may indicate which sources 108 have and have not complied with SLAs 142, how often sources 108 do and do not comply with SLAs 142, and/or other metrics or information based on determinations made by the import anomaly detector 122.

The processing stage anomaly detector 124 can be configured to detect data anomalies and/or other data quality issues associated with data 104 being processed and/or output by individual processing stages 110 of the data processing system 106. The processing stage anomaly detector 124 can, for example, determine that data 104 output by a particular processing stage does not match, or correspond with, data 104 input to that particular processing stage. As another example, the processing stage anomaly detector 124 can determine when processing stages 110 may be taking longer than expected to process data 104.

In some examples, the configuration data 140 may indicate types and/or amounts of data 104 that are expected to be input to, and output by, individual processing stages 110, such that the processing stage anomaly detector 124 can use the configuration data 140 to determine whether particular processing stages 110 are outputting data 104 that may be anomalous relative to data 104 provided to those particular processing stages 110.

In other examples, the processing stage anomaly detector 124 can be, or be associated with, a machine learning model that is based on convolutional neural networks, recurrent neural networks, other types of neural networks, nearest-neighbor algorithms, regression analysis, deep learning algorithms, Gradient Boosted Machines (GBMs), Random Forest algorithms, and/or other types of artificial intelligence or machine learning frameworks. The machine learning model associated with the processing stage anomaly detector 124 can be trained to predict types and/or amounts of data 104 that individual processing stages 110 are likely to output, based on the types and/or amounts of data 104 input to those individual processing stages 110.

For example, the data quality evaluation system 102 can maintain historical data 114 indicating types and/or amounts of data 104 provided to, and output by, individual processing stages 110 over a period of time. The machine learning model associated with the processing stage anomaly detector 124 can accordingly be trained to identify, based on the historical data 114, attributes in input data 104 provided to individual processing stages 110 that are predictive of types and/or amounts of output data 104 generated by those processing stages 110 based on the input data 104. After being trained to identify such predictive attributes, the machine learning model associated with the processing stage anomaly detector 124 can identify the predictive attributes in new data 104 being input to individual processing stages 110, and use the predictive attributes to predict the types and/or amounts of corresponding output data 104 that are likely to be output by the processing stages 110. The processing stage anomaly detector 124 can accordingly determine whether particular processing stages 110 are outputting data 104 that may be anomalous relative to data 104 the machine learning model associated with the processing stage anomaly detector 124 predicts should be output by the particular processing stages 110.

As another example, the processing stage anomaly detector 124 can determine when a processing stage is taking longer than a threshold amount of time to process instances of data 104. For example, the processing stage anomaly detector 124 may determine, based on historical data 114, machine learning analysis, configuration data 140, and/or other information that processing stage 110B processes most instances of data 104 within thirty minutes. The processing stage anomaly detector 124 may determine if and/or when processing stage 110B takes longer than thirty minutes to process data 104, and generate data quality results 130 indicating a potential problem with processing stage 110B if the number of data instances that take longer than thirty minutes to process exceeds a threshold amount.

If the processing stage anomaly detector 124 determines that a particular processing stage is outputting data 104 that may be unexpected or anomalous relative to the data 104 input to the particular processing stage, the processing stage anomaly detector 124 can generate data quality results 130 associated with the particular processing stage. The data quality results 130 can, for instance, include an identifier of the particular processing stage. The data quality results 130 may also include an identifier or descriptor of one or more types of data anomalies or other data quality issues associated with the particular processing stage, such as indications that the particular processing stage is producing too much, or not enough, output data 104 relative to input data 104, identifiers of specific instances of data 104 that the particular processing stage is failing to pass along to one or more subsequent processing stages 110 in a pipeline, and/or any other types of information associated with data quality issues detected by the processing stage anomaly detector 124. Accordingly, based on these data quality results 130, technical issues or other problems with the particular processing stage that may be causing the data quality issues can be investigated and/or corrected.

As a first example, a particular processing stage may be configured to operate on records, claims, or other elements in data 104 provided to the particular processing stage, and then pass along the data 104 or corresponding new data 104 that contains the same number of records, claims, or other elements to a subsequent processing stage. In this example, the processing stage anomaly detector 124 can determine when the data 104 output from the particular processing stage does not contain the same number of records, claims, or other elements as the data 104 input to the particular processing stage, and generate corresponding data quality results 130. Based on the data quality results 130, technical issues that may be preventing the particular processing stage from passing along the same number of records, claims, or other elements in output data 104 as the particular processing stage received input data 104, such as misconfigurations, insufficient memory resources and/or other computing resource, or other technical issues, can be investigated and/or fixed.

As a second example, a particular processing stage may be configured to determine whether two instances of data 104 are associated with the same claim, plan participant, or other entity or element, and if so combine the two instances of data 104 into one instance of data 104 to be operated on further by subsequent processing stages 104. In this example, the processing stage anomaly detector 124 may use historical data 114 to determine that the particular processing stage usually combines instances of incoming data 104 at a rate such that the volume of data 104 output by the particular processing stage is, on average, between 70% and 80% of the volume of data 104 input to the particular processing stage. The processing stage anomaly detector 124 may, however, determine that the particular processing stage is currently producing a volume of output data 104 that is below 70%, or higher than 80%, of the volume of data 104 input to the particular processing stage. Accordingly, the processing stage anomaly detector 124 can output data quality results 130 indicating that the particular processing stage is outputting more, or less, than an expected amount of output data to subsequent processing stages 110, such that possible misconfigurations or other technical issues with the particular processing stage can be investigated and/or fixed.

In some examples, the processing stage anomaly detector 124 can determine that data 104 output by a processing stage is anomalous or may be associated with data quality issues if the output data 104 is different from data 104 input to the processing stage, or that is expected to be generated and/or output by the processing stage based on the data 104 input to the processing stage, by more than a threshold degree. For example, a threshold associated with a particular processing stage can be set to 5%, to indicate that the number of instances of data 104 passed by the particular processing stage to a subsequent processing stage is expected to be within 5% of the number of instances of data 104 received by the particular processing stage. Accordingly, in this example, if the particular processing stage outputs only 90% of the number of instances of data 104 that it receives, the processing stage anomaly detector 124 can determine that a data anomaly or other data quality issue may be associated with the particular processing stage, and generate corresponding data quality results 130.

In some situations, there can be legitimate reasons for data instances 104 to be held up at certain processing stages 110, and not passed on to later processing stages 110. For example, if the data 104 includes claims data associated with benefit plans, a processing stage 110 may be configured to determine whether individuals identified in the claims data are currently covered by a benefit plan. If the processing stage determines that individuals are covered by benefit plans, the processing stage may pass the corresponding claims data on to subsequent processing stages 110. However, if the processing stage determines that individuals are not covered by benefit plans, or is unable to determine whether individuals are covered by benefit plans, the processing stage may hold the corresponding claims data for further analysis, and not pass the claims data to subsequent processing stages 110. Accordingly, a threshold degree for variances between data 104 provided to the processing stage and data 104 output by the processing stage can be set based on how many claims are held at the processing stage for further analysis on average, or a prediction of how many claims are expected to be held at the processing stage for further analysis. However, if variances between data 104 provided to the processing stage and data 104 output by the processing stage exceed such a threshold, the processing stage anomaly detector 124 can determine that a data anomaly or other data quality issue may be associated with the processing stage and generate corresponding data quality results 130.

Although the processing stage anomaly detector 124 can generate data quality results 130 if the processing stage anomaly detector 124 detects data quality issues associated with one or more processing stages 110 as described above, in some examples the processing stage anomaly detector 124 can also generate data quality results 130 when the processing stage anomaly detector 124 determines that processing stages 110 are processing data 104 as expected and/or may be holding data 104 for legitimate reasons. For example, if the processing stage anomaly detector 124 determines that a particular processing stage is outputting an expected amount of data 104, based on an amount of data 104 provided to that particular processing stage, the processing stage anomaly detector 124 can generate data quality results 130 indicating that the particular processing stage is operating as expected. Accordingly, the data quality results 130 may indicate which specific processing stages 110 may be associated with data quality issues, indicate relative amounts of data quality issues associated with different processing stages 110, and/or other metrics or information based on determinations made by the processing stage anomaly detector 124.

The pattern anomaly detector 126 can be configured to detect data anomalies and/or other data quality issues associated with patterns of data 104 that has been received from sources 108, and/or has or is being processed by the data processing system 106. In some examples, the data quality evaluation system 102 can maintain historical data 114 indicating types and/or amounts of data 104 provided by sources 108 in the past, and/or that has been processed by the data processing system 106 in the past. In other examples, the historical data 114 can be maintained by another system or entity, such as an external database or repository that the pattern anomaly detector 126 and/or other elements of the data quality evaluation system 102 can access. The historical data 114 can indicate patterns, such as average amounts of data 104 and/or processed during periods of time, trends of increasing or decreasing amounts of data 104 received and/or processed during periods of time, and/or other types of patterns or trends. The pattern anomaly detector 126 can determine whether the data 104 received and/or processed by the data processing system 106 corresponds with such patterns, or does not correspond with such patterns and may be anomalous relative to the patterns.

The historical data 114 can indicate patterns in association with individual sources 108, individual types of data 104, and/or for the overall data processing system 106. For example, a pattern associated with data 104 provided by a particular source can be determined from the historical data 114. As another example, a pattern associated with data 104 provided by multiple sources 108, but associated with a particular sponsor and/or a particular benefit plan, can be determined from the historical data 114. As still another example, pattern associated with all the data 104 processed by the data processing system 106 during individual days, weeks, months, years, or other time periods can be determined from the historical data 114.

In some examples, the pattern anomaly detector 126 can determine whether amounts and/or types of data 104 currently being received and/or processed by the data processing system 106 are anomalous, relative to patterns indicated by the historical data 114. In other examples, the pattern anomaly detector 126 can use the historical data 114 to generate predictions of types and/or amounts of data 104 that the data processing system 106 should be receiving and/or processing, and determine whether the amounts and/or types of data 104 currently being received and/or processed by the data processing system 106 are anomalous relative to those predictions.

As an example, a particular source may provide the data processing system 106 with a batch of data 104 associated with a set of fifty claims. However, averages, trends, or other patterns indicated by the historical data 114 may indicate that the particular source usually provides, or is predicted to provide, batches of data 104 associated with five hundred claims. Accordingly, although some data 104 was received from the particular source, the pattern anomaly detector 126 can determine that the provided data 104 is anomalous relative to historical trends and/or corresponding predictions associated with the particular source.

As another example, during a particular week the data processing system 106 may process ten thousand instances of data 104. However, the historical data 114 may indicate that the data processing system 106 normally processes thirty thousand instances of data 104 during an average week, or would be predicted to process thirty thousand instances of data 104 during the particular week. Accordingly, although the data processing system 106 is processing instances of data 104, the pattern anomaly detector 126 can determine that the amount of data 104 being processed is anomalous relative to historical trends and/or corresponding predictions.

In some examples or situations, the pattern anomaly detector 126 can detect data anomalies and/or other data quality issues that may not be detected by other data quality evaluators 118. For instance, in the above example in which a particular source provides a batch of data 104 associated with a set of fifty claims, the provided data 104 may be valid and not include any errors that would be detected by the data error detector 120. The particular source may also have provided the data 104 in compliance with a corresponding SLA, for instance by a particular day and time and/or in a particular format defined by the SLA, such that the import anomaly detector 122 may not detect any data quality issues with the provided data 104. The processing stages 110 may process the received data 104 as expected, such that the processing stage anomaly detector 124 may not detect any data quality issues with the processing of the data 104 by the processing stages 110. However, because the data 104 that was received was associated with fewer claims than would be expected based on the historical data 114, the pattern anomaly detector 126 can determine that the received data 104 is anomalous even if the received data 104 does not contain errors, is provided in compliance with an SLA, and/or can be processed normally by the processing stages 110.

As discussed above, in some examples the pattern anomaly detector 126 can use the historical data 114 to generate predictions of types and/or amounts of data 104 that the data processing system 106 should be receiving and/or processing. The pattern anomaly detector 126 can be, or be associated with, a machine learning model that is based on convolutional neural networks, recurrent neural networks, other types of neural networks, nearest-neighbor algorithms, regression analysis, deep learning algorithms, GBMs, Random Forest algorithms, and/or other types of artificial intelligence or machine learning frameworks. The machine learning model associated with the pattern anomaly detector 126 can be trained, based on the historical data 114, to predict types and/or amounts of data 104 that are likely to be received from one or more sources 108 in the future, and/or that are likely to be processed by the data processing system 106 in the future.

As an example, if the historical data 114 indicates that a particular source has been providing data 104 associated with progressively higher amounts of claims over time, the machine learning model associated with the pattern anomaly detector 126 may predict that the next batch of data 104 provided by that particular source will be associated with a higher number of claims that the last batch of data 104 provided by the particular source. As another example, if the historical data 114 indicates that a particular source provides more data 104 during certain periods of times than other periods of time, the machine learning model associated with the pattern anomaly detector 126 may identify factors in the historical data 114 that are predictive of previously provided amounts of data 104, such that the pattern anomaly detector 126 can use those predictive factors to predict how much data 104 the particular source is likely to provide in the future.

In some examples, the pattern anomaly detector 126 can determine that data 104 received by, and/or processed by, the data processing system 106 is anomalous if the data 104 is different from a pattern in the historical data 114, or a prediction generated based on the historical data 114, by more than a threshold degree. For example, if the threshold degree is set to 10%, and new data 104 provided by a source contains 5% fewer claims than an average amount of claims included in previous data 104 provided by that source, the pattern anomaly detector 126 may not determine that the new data 104 is anomalous. However, if new data 104 provided by the source instead contains 15% fewer claims than the average amount of claims included in previous data 104 provided by that source, the pattern anomaly detector 126 may determine that the new data 104 is anomalous because the new data 104 contains fewer claims than previous data 104 by a degree that exceeds the 10% threshold degree.

If the pattern anomaly detector 126 determines that data 104 received by, and/or processed by, the data processing system 106 is anomalous relative to patterns in the historical data 114 or predictions generated based on the historical data 114, the pattern anomaly detector 126 can generate corresponding data quality results 130. For instance, the data quality results 130 can include an identifier of a source that has provided less data 104 than would be expected based on the historical data 114, an indicator that the data processing system 106 has been processing less data 104 during a period of time than would be expected based on the historical data 114, and/or indicators of other data anomalies relative to patterns indicated by the historical data 114. Accordingly, based on these data quality results 130, technical issues and/or other problems with the sources 108 and/or the data processing system 106 that may be leading to the data quality issues can be investigated and/or corrected.

For example, if the data quality results 130 indicate a data anomaly associated with a particular source providing fewer instances of data 104 than would be expected based on patterns in the historical data 114, the source may be experiencing a technical issue that is preventing the source from providing a full set of data 104 to the data processing system 106. Accordingly, the source can be notified about the data anomaly, and the source may be able to correct the technical issue such that the source can provide any data 104 that has not yet been provided, and/or provide full sets of data 104 again in the future.

As another example, if the data quality results 130 indicate that fewer instances of data 104 have been received from a particular source than would be expected based on patterns in the historical data 114, a technical issue with an API or other channel that is used by the data processing system 106 to receive data 104 from the source may be preventing the data processing system 106 from receiving all of the data 104 that the source has and/or is trying to provide to the data processing system 106. Accordingly, the technical issue with the API or other channel can be investigated and fixed, such that the technical issue no longer prevents the source from providing all of the data 104 to the data processing system 106.

Although the pattern anomaly detector 126 can generate data quality results 130 if the pattern anomaly detector 126 determines that data 104 received by, and/or processed by, the data processing system 106 is anomalous relative to patterns in the historical data 114 or predictions generated based on the historical data 114, in some examples the pattern anomaly detector 126 can also generate data quality results 130 when the pattern anomaly detector 126 determines that the data 104 corresponds with such patterns or predictions. For example, if the pattern anomaly detector 126 determines that an amount of data 104 processed during a period of time corresponds with a historical trend, the pattern anomaly detector 126 can generate data quality results 130 indicating that the data 104 processed during that period of time corresponds to the historical trend. Accordingly, the data quality results 130 may indicate which specific sources 108, time periods, or other categories or sets of data 104 may be associated with data quality issues relative to the historical data 114, and/or indicate other metrics or information based on determinations made by the pattern anomaly detector 126.

The data quality validator 128 can be configured to detect data anomalies and/or other data quality issues with data 104 received by, and/or processed by, the data processing system 106, based on validation data 116 provided by one or more validation sources. The validation data 116 can be similar to the data 104, but may in some examples include different types of documents or information. For instance, while in some examples the data 104 provided to the data processing system 106 by sources 108 can be claims data, the validation data 116 can be invoices or other billing data, reconciliation data, and/or other types of data that may be related to the claims data.

In some examples, the validation sources can be different than the sources 108 of the data 104, but the validation data 116 provided by the validation sources can correspond with information that the sources 108 have provided to the validation sources. For example, external entities that receive output 112 from the data processing system 106 can, in some examples, be validation sources that provide validation data 116 to the data processing system 106.

As an example, and as described above, the data processing system 106 can be associated with a benefit plan administrator. The output 112 produced via the data processing system 106 can be reports for sponsors of benefit plans managed by the benefit plan administrator. Such reports may indicate numbers of claims that were submitted by sources 108 to the data processing system 106 in association with the benefit plans, aggregated dollar amounts associated with the submitted claims, how many of the submitted claims were approved and/or denied, and/or other information associated with the claims submitted to the data processing system 106 by sources 108. Although in this example the sources 108 can provide claims data and/or other data 104 directly to the data processing system 106 for processing, the sources 108 may also provide the same data and/or related data directly to the sponsors of the benefit plans. For instance, a dental network may submit claims associated with a benefit plan to the data processing system 106 for adjudication, but also send corresponding claim summaries, billing summaries, and/or other information directly to the sponsor of the benefit plan. The sponsors of the benefit plans can accordingly provide the data that the sponsors receive from one or more sources 108, and/or other data derived by the sponsors from the data provided by the sources 108 to the sponsors, to the data processing system 106 as validation data 116.

The data quality validator 128 can determine whether amounts and/or types of data 104 being received and/or processed by the data processing system 106 are anomalous relative to the validation data 116. The data quality validator 128 can also determine whether amounts and/or types of data 104 that are being used to generate output 112, or would be used to generate output 112, are anomalous relative to the validation data 116.

As an example, the data processing system 106 may have received a batch of data 104 from a particular source that is associated with a set of 10,000 records. However, validation data 116 received from a validation source may indicate that the particular source indicated, to the validation source, that the particular source had data associated with 30,000 records. Accordingly, the data quality validator 128 can determine that more data should have been received from the particular source, and identify a corresponding data anomaly.

As another example, the data processing system 106 may have processed data 104 associated with a total amount of 50,000 claims associated with a benefit plan for a sponsor during a particular month. One or more sources 108 may have provided with sponsor with information indicating that a total 100,000 claims were associated with that benefit plan during the month. Accordingly, the data quality validator 128 can determine that more data should have been received from the sources 108 in association with the benefit plan, and identify a corresponding data anomaly.

In some examples, the data quality validator 128 can determine that data 104 received by, and/or processed by, the data processing system 106 is anomalous if the data 104 is different from corresponding validation data 116 by more than a threshold degree. For example, if the threshold degree is set to 5%, and validation data 116 indicates that data 104 provided by a source likely should have included 3% more records, the data quality validator 128 may not determine that the data 104 provided by the source is anomalous. However, if the validation data 116 instead indicates that the data 104 provided by the source likely should have included 8% more records, the data quality validator 128 may determine that the data 104 provided by the source is anomalous because the data 104 contains a number of records that differs by more than the 5% threshold degree from the number of records indicated by the validation data 116.

If the data quality validator 128 determines that data 104 received by, and/or processed by, the data processing system 106 is anomalous relative to the validation data 116, the data quality validator 128 can generate corresponding data quality results 130. For instance, the data quality results 130 can include an identifier of a source that has provided less data 104 than would be expected based on the validation data 116, an indicator that the data processing system 106 has been processing less data 104 during a period of time than would be expected based on the validation data 116, and/or indicators of other data anomalies relative to the validation data 116. Accordingly, based on these data quality results 130, technical issues or other problems with the sources 108 and/or the data processing system 106 can be investigated and/or corrected.

For example, if the data quality results 130 indicate a data anomaly associated with a particular source providing fewer instances of data 104 than would be expected based on the validation data 116, the source may be experiencing a technical issue that is preventing the source from providing a full set of data 104 to the data processing system 106. Accordingly, the source can be notified about the data anomaly, and the source may be able to correct the technical issue such that the source can provide any data 104 that has not yet been provided, and/or provide full sets of data 104 again in the future. Similarly, a technical issue with an API or other channel that is used by the data processing system 106 to receive data 104 from the source may be preventing the data processing system 106 from receiving all of the data 104 that the source has and/or is trying to provide to the data processing system 106. Accordingly, the technical issue with the API or other channel can be investigated and fixed, such that the technical issue no longer prevents the source from providing all of the data 104 to the data processing system 106.

Although the data quality validator 128 can generate data quality results 130 if the data quality validator 128 determines that data 104 received by, and/or processed by, the data processing system 106 is anomalous relative to the validation data 116, in some examples the data quality validator 128 can also generate data quality results 130 when the data quality validator 128 determines that the data 104 corresponds with the validation data 116. For example, if the data quality validator 128 determines that an amount of data 104 processed during a period of time corresponds with validation data 116 associated with that period of time, the data quality validator 128 can generate data quality results 130 indicating that the data 104 processed during that period of time corresponds to the validation data 116. Accordingly, the data quality results 130 may indicate which specific sources 108, time periods, or other categories or sets of data 104 may be associated with data quality issues relative to the validation data 116, and/or indicate other metrics or information based on determinations made by the data quality validator 128.

In some examples or situations, the data quality validator 128 can detect data anomalies and/or other data quality issues that may not be detected by other data quality evaluators 118. As an example, the data processing system 106 may receive a batch of 10,000 records from a particular source. The batch of 10,000 records may include valid data, be received in compliance with an SLA, be processed as expected by the processing stages 110, and the amount or records may be in line with historical trends. Accordingly, the data error detector 120, the import anomaly detector 122, the processing stage anomaly detector 124, and/or the pattern anomaly detector 126 may not detect data quality issues associated with the batch of 10,000 records. However, if the validation data 116 indicates that the particular source had 15,000 records, the data quality validator 128 can determine that additional data likely should have been received from the particular source.

Overall, the data quality evaluation system 102 can execute one or more of the data quality evaluators 118 on data 104 received by one or more sources 108, and/or that has or is being processed by the data processing system 106, to detect one or more types of data quality issues and generate corresponding data quality results 130, as discussed above. In some examples, if the data quality results 130 indicate that data 104 may be anomalous in one or more ways or may be associated with other data quality issues, the data quality results 130 can also indicate that if reports or other types of output 112 were to be generated based on the data 104, the output 112 may be erroneous or incomplete. Accordingly, the data processing system 106 may wait to generate output 112 until data quality results 130 indicate that the underlying data 104, from which the output 112 is generated, is not anomalous or is associated with less than a threshold number of data anomalies and/or data quality issues. Similarly, if a report or other type of output 112 is generated by the data processing system 106 based on underlying data 104, the generated output 112 can be held and not be provided to one or more destinations until the data quality evaluation system 102 verifies that the data quality results 130 indicate that the underlying data 104 is not anomalous or is associated with less than a threshold number of data anomalies and/or data quality issues. The data quality results 130 can be used by the scorecard generator 132 and/or the anomaly notifier 134, as discussed further below.

In some examples, the configuration data 140 can include scheduling information indicating when different data quality evaluators 118 are to be executed. For example, the configuration data 140 may indicate that the data error detector 120 should execute when any new data 104 is received, but that that the pattern anomaly detector 126 should execute once a week or on different schedules with respect to data 104 associated with different sources 108.

The configuration data 140 can also indicate queries that the different data quality evaluators 118 are to execute. For example, the configuration data 140 can indicate that the import anomaly detector 122 should execute one or more particular queries associated with an SLA for a particular source, for example to verify whether the particular source has provided certain types of data 104 at by certain times defined in the SLA. In some examples, the queries can be SQL queries or other types of database queries defined in the configuration data 140.

The configuration data 140 can also indicate threshold values used by one or more of the data quality evaluators 118. For example, the configuration data can indicate threshold values associated with allowable tolerances between amounts of input data 104 and output data 104 associated with individual processing stages 110 used by the processing stage anomaly detector 124, allowable tolerances between data 104 and historical patterns used by the pattern anomaly detector 126, allowable tolerances between data 104 and validation data 116 used by the data quality validator 128, and/or other types of threshold values associated with one or more of the data quality evaluators 118. In some examples, such threshold values can be manually set by users of the data quality evaluation system 102. In other examples, the threshold values can be automatically determined and/or updated over time. For example, a machine learning system or other element of the data quality evaluation system 102 may determine that differences between amounts of input data 104 and output data 104 associated with a particular processing stage are decreasing over time, and accordingly automatically reduce a threshold value used by the processing stage anomaly detector 124.

Users may adjust the configuration data 140, for example by editing configuration files or by generating new configuration files via a user interface of the data quality evaluation system 102 or another system. Accordingly, users can adjust attributes of the operations of the data quality evaluation system 102, such as the scheduling of when the data quality evaluation system 102 executes different data quality evaluators 118, queries that define what types of data 104 the different data quality evaluators 118 evaluate, thresholds used by the different data quality evaluators 118 and/or other operations by adjusting the configuration data 140, rather than changing the source code of the data quality evaluation system 102.

Figure 2:
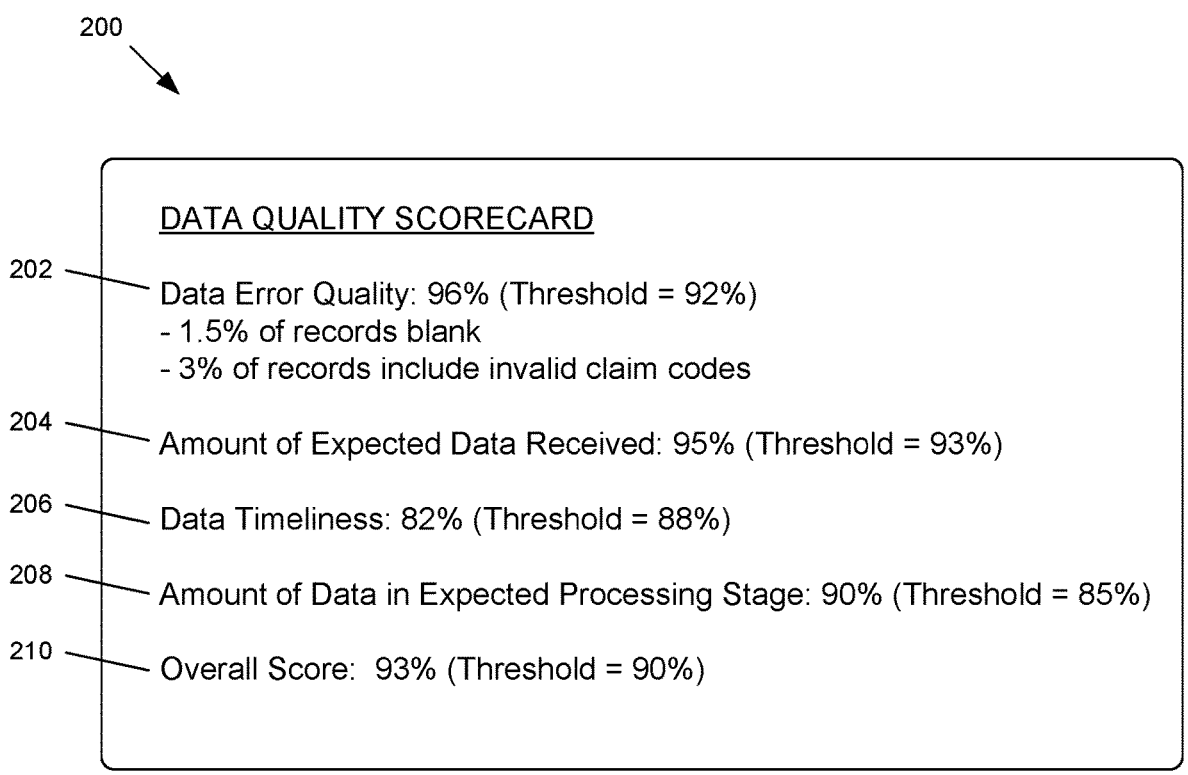
FIG. 2 shows an example of a data quality scorecard that can be generated by a scorecard generator of the data quality evaluation system.

As discussed above, the scorecard generator 132 and the anomaly notifier 134 can be configured to use data quality results 130 generated by the data quality evaluators 118. The scorecard generator 132 can, for example, use the data quality results 130 generate data quality scorecards 136 that express scores for one or more metrics associated with the quality of the data 104 received from sources 108 and/or processed by the data processing system 106. The scorecard generator 132 may present the data quality scorecards 136 via a user interface of the data quality evaluation system 102, output the data quality scorecards 136 to a database or other memory location, transmit the data quality scorecards 136 to one or more designated email addresses or other destinations, or otherwise output the data quality scorecards 136 for immediate and/or later viewing or analysis by one or more users or systems. An example of a data quality scorecard is shown in FIG. 2, and is discussed further below with respect to that figure.

The configuration data 140 can indicate types of metrics to be determined by the scorecard generator 132 and presented in one or more types of data quality scorecards 136, for example as discussed further below with respect to FIG. 2. In some examples, the configuration data 140 can also indicate allowable thresholds associated with corresponding metrics, such that the data quality scorecards 136 can indicate whether determined scores for those metrics do or do not meet corresponding allowable thresholds. In some examples, the configuration data 140 may also, or alternately, indicate weights associated with different types of metrics, such that the scorecard generator 132 can determine individual scores for different types of metrics, and then determine a final overall data quality score using a weighted average, or other weighted combination, of the individual scores.

Users can adjust the configuration data 140, as described above, to change the types of metrics determined by the scorecard generator 132 and presented in one or more types of data quality scorecards 136, add new types of metrics, adjust allowable thresholds associated with corresponding metrics, adjust weights associated with different types of metrics, and/or otherwise change the operations of the scorecard generator 132. Accordingly, users can adjust attributes of the operations of the scorecard generator 132 by adjusting the configuration data 140, rather than changing the source code of the data quality evaluation system 102.

The scorecard generator 132 can generate data quality scorecards 136 associated with individual sources 108, groups of sources 108, individual processing stages 110, individual sponsors or other destinations for output 112, and/or the overall data processing system 106. In some examples, the data quality scorecards 136 can present scores for one or more metrics that are associated with periods of time, and/or can indicate how such scores have been trending or changing over time. The data quality scorecards 136 can also indicate whether such scores do or do not meet allowable thresholds.

Overall, the scores presented in the data quality scorecards 136 can be indicative whether data anomalies and/or other data quality issues may exist with certain sources 108 and/or with the data processing system 106. For example, if data quality scorecards 136 associated with two sources 108 indicate lower scores associated with a first source than a second source, or scores associated with the first source do not meet allowable thresholds while scores associated with the second source do meet allowable thresholds, the data quality scorecards 136 may indicate that data quality issues are more likely to exist with the data 104 associated with the first source than the second source. Accordingly, issues that may be leading to the data quality issues with the first source can be investigated and/or corrected.

The anomaly notifier 134 can also use the data quality results 130 to generate and output anomaly notifications 138 when data quality results 130 are generated by one or more data quality evaluators 118 that are indicative of data anomalies or other data quality issues. For example, the anomaly notifier 134 can periodically or occasionally access or query a database of data quality results 130 to identify newly added data quality results 130, and generate and output corresponding anomaly notifications 138. The anomaly notifier 134 may present the anomaly notifications 138 via a user interface of the data quality evaluation system 102, output the anomaly notifications 138 to a database or other memory location, transmit the anomaly notifications 138 to one or more designated email addresses or other destinations, or otherwise output the anomaly notifications 138 for immediate and/or later viewing or analysis by one or more users or systems.

The anomaly notifications 138 can indicate information associated with the data anomalies or data quality issues, such as descriptions of the data quality issues, identifiers of sources 108 associated with the data quality issues, processing stages 110 associated with the data quality issues, and/or any other information associated with the data quality issues. Accordingly, based on the anomaly notifications 138, technical issues or other problems that may be causing the data quality issues can be investigated and/or corrected. Because an anomaly notification can indicate specific information about a specific data anomaly or data quality issue, such as a particular source associated with a data anomaly or a particular processing stage associated with a data anomaly, the anomaly notification can help pinpoint specific technical issues, specific sources 108, and/or specific elements of the data processing system 106 that may be causing the data quality issue, such that the data quality issue can be investigated and corrected more quickly than if such specific information was not included in the anomaly notification.

For example, if the data error detector 120 generates data quality results 130 indicating that certain data 104 received from a certain source includes data errors, the anomaly notifier 134 can generate a corresponding anomaly notification. Accordingly, the source can be notified about the data errors, and corrected data can be provided and/or the source can fix technical issues that may be causing the data errors. As another example, the import anomaly detector 122, the pattern anomaly detector 126, and/or the data quality validator 128 may determine that a particular source is not providing an expected amount of data 104, for example as promised in an SLA and/or that would be expected based on the historical data 114 and/or the validation data 116. Accordingly, the anomaly notifier 134 can generate a corresponding anomaly notification, such that the particular source can be notified and technical problems preventing the source from providing the expected amount of data 104 can be corrected, and/or technical problems with APIs or other channels that may be preventing the data processing system 106 from receiving the expected amount of data 104 from the particular source can be corrected. As yet another example, if the processing stage anomaly detector 124 determines that a particular processing stage is not outputting an expected amount of data 104 to a subsequent processing stage, based on the data 104 being input to the particular processing stage, the anomaly notifier 134 can generate a corresponding anomaly notification that identifies the particular processing stage. Accordingly, misconfigurations or other technical problems that may be causing data 104 to be held up at the particular processing stage can be investigated and corrected.

Because the anomaly notifications 138 can be generated automatically, based on data quality results 130 determined automatically by one or more data quality evaluators 118, technical issues or other problems that may be leading to data anomalies or data quality issues can be identified and corrected more quickly than in conventional systems that may rely on manual detection of data anomalies and data quality issues. For example, if the data processing system 106 receives data 104 from hundreds of sources 108, but an API or data delivery channel associated with one particular source experiences an error, most of the sources 108 may be providing data as expected, and it may not be immediately apparent to human system administrators that no data 104, or less data 104 than would be expected is being received from the particular source. It may take such human system administrators weeks or months to recognize that an issue exists with the particular source. However, the data quality evaluation system 102 can generate an anomaly notification as soon as the import anomaly detector 122, the pattern anomaly detector 126, and/or the data quality validator determine that the particular source is not providing an expected amount of data 104, such that the issue can be identified and fixed sooner than it might otherwise be noticed.

Early correction of such issues, in response to anomaly notifications, can result in bandwidth savings, savings in processor cycles, memory, and other computing resources, and/or other efficiency improvements. For example, the data processing system 106 may use bandwidth resources to receive data 104 from a source. If the data 104 is discovered to include errors, additional bandwidth resources can be used to received corrected versions of the data 104. However, because one or more data quality evaluators 118 can automatically detect such erroneous data 104, the issue can be identified more quickly, and less corrected data 104 may need to be re-transmitted such that fewer bandwidth resources are consumed overall. As another example, if the processing stage anomaly detector 124 detects that a particular processing stage may be mishandling data 104, the issue with the particular processing stage can be fixed more quickly, such that fewer instances of the mishandled data 104 may need to be reprocessed and usage of corresponding processor cycles and memory resources can be reduced.

FIG. 2 shows an example of a data quality scorecard 200 that can be generated by the scorecard generator 132 based on data quality results 130. As discussed above, the data quality results 130 can be generated by one or more of the data quality evaluators 118, such as the data error detector 120, the import anomaly detector 122, the processing stage anomaly detector 124, the pattern anomaly detector 126, and/or the data quality validator 128. The scorecard generator 132 can be configured, for instance via configuration data 140, to generate data quality scorecards 136, such as the data quality scorecard 200 shown in FIG. 2, that express scores for one or more metrics.

The scorecard generator 132 can generate such data quality scorecards 136 in association with all of the data 104 received and/or processed by the data processing system 106 during a period of time, or can generate such data quality scorecards 136 in association with the data 104 associated with particular sources 108, particular types of data 104, particular processing stages 110, and/or other specific levels of data 104. For example, if the data processing system 106 is associated with a benefit plan administrator that manages benefit plans on behalf of sponsors, the scorecard generator 132 may be configured to generate data quality scorecards 136 that are specific to data 104 associated with a particular sponsor and/or a specific benefit plan.

As shown in FIG. 2, the data quality scorecard 200 can express scores for metrics, such as a data error quality metric 202, an expected data amount metric 204, a data timeliness metric 206, an expected processing stage metric 208, and/or an overall metric 210. In other example, the data quality scorecard 200, or other data quality scorecards 136, can express scores for fewer metrics, additional metrics, or different types of metrics, and/or any other different type of that is indicated in, or can be derived from, the data quality results 130.

The data error quality metric 202 can be based on data quality results 130 generated by the data error detector 120, and/or other data quality evaluators 118, associated with errors in data received and/or processed by the data processing system 106. For example, the data error quality metric 202 in the data quality scorecard 200 can indicate an overall rate of instances of data 104 that were not found to include data errors, such as blank fields, invalid values, or other errors. The data quality scorecard 200 can also show an allowable threshold associated with the data error quality metric 202. The data quality scorecard 200 may also show additional information associated with specific types of data errors, in or alongside the data error quality metric 202.

The expected data amount metric 204 can be based on data quality results 130 generated by the import anomaly detector 122, the pattern anomaly detector 126, the data quality validator 128, and/or other data quality evaluators 118, that indicate whether an expected amount of data 104 has been received by the data processing system 106 based on SLAs 142, trends or patterns in the historical data 114, and/or the validation data 116. For example, the expected data amount metric 204 in the data quality scorecard 200 can indicate a percentage of an expected amount of data that has actually been received by the data processing system 106. The data quality scorecard 200 can also show an allowable threshold associated with the expected data amount metric 204.

The data timeliness metric 206 can be based on data quality results 130 generated by the import anomaly detector 122, and/or other data quality evaluators 118, that indicate a rate at which data 104 received by the data processing system 106 arrived on time, for instance based on schedules or deadlines indicated in SLAs 142. For example, although data 104 may have arrived from a particular source such that the expected data amount metric 204 has a relatively high score, if that data 104 arrived after a deadline in an SLA, the data timeliness metric 206 may have a relatively low score. The data quality scorecard 200 can also show an allowable threshold associated with the data timeliness metric 206.

The expected processing stage metric 208 can be based on data quality results 130 generated by the processing stage anomaly detector 124, and/or other data quality evaluators 118, that indicate a rate at which instances of data 104 are being processed by expected processing stages 110 of the data processing system 106. For example, if a particular processing stage is experiencing issues and is not passing data 104 along to a subsequent processing stage as expected, the expected processing stage metric 208 may have a lower score than if the particular processing stage is passing data 104 to the subsequent processing stage as expected. The data quality scorecard 200 can also show an allowable threshold associated with the expected processing stage metric 208.

The overall metric 210 can be a combination of the other metrics, such as the data error quality metric 202, the expected data amount metric 204, the data timeliness metric 206, and the expected processing stage metric 208. In some examples, the scorecard generator 132 can determine the overall metric 210 by combining scores of the other metrics with equal weight. In other examples, the configuration data 140 may indicate different weights for different types of metrics, such that the scorecard generator 132 can determine the overall metric 210 as a combination that weights scores for some metrics more heavily than scores for other metrics. The data quality scorecard 200 can also show an allowable threshold associated with the overall metric 210.

In some examples, the data quality scorecard 200 can show scores for multiple metrics, as shown in FIG. 2. In other examples, the scorecard generator 132 can determine scores for the multiple metrics, but only include the overall metric 210 generated from those scores in the data quality scorecard 200. As described above, the scorecard generator 132 may also generate the data quality scorecard 200 to show different types of metrics than are shown in FIG. 2.

The scorecard generator 132 can generate different data quality scorecards 136 in association with different sources 108, different sponsors, different types of data 104, and/or the overall data processing system 106, and may generate such different data quality scorecards 136 for different periods of time. Accordingly, comparison of different data quality scorecards 136 may indicate factors that may be contributing to, or causing, data quality issues. For example, if data quality scorecards show that a first source has a lower score for the expected data amount metric 204 than a second source, or that scores of the first source for the expected data amount metric 204 have been decreasing over time, the expected data amount metric 204 may indicate that an issue may be preventing the first source from providing all of its data 104 to the data processing system 106. Indications of such an issue, in the data quality scorecards 136, can allow the issue to be investigated and/or corrected.

Figure 3:
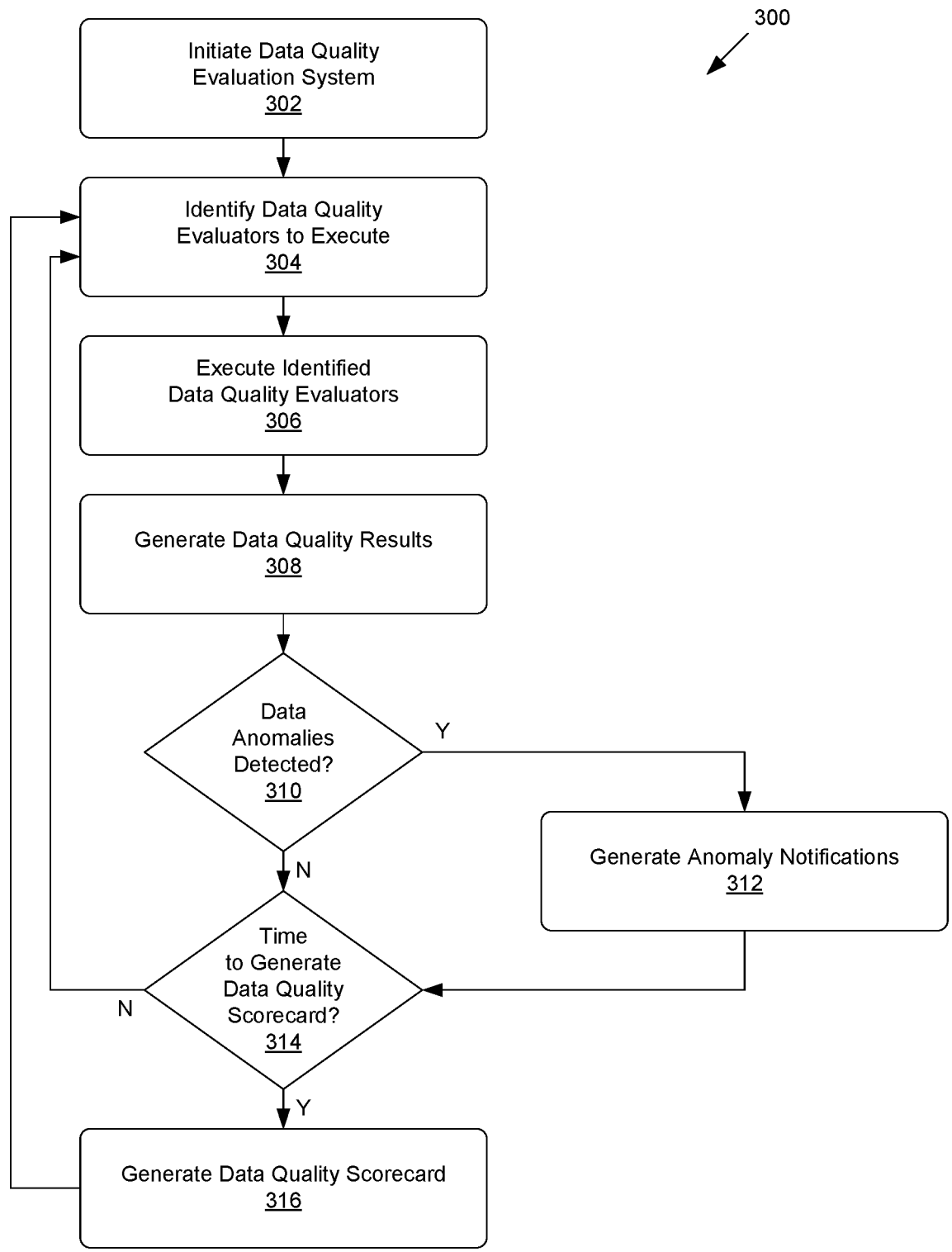
FIG. 3 shows a flowchart of an example process for evaluating data quality in association with the data processing system.

FIG. 3 shows a flowchart of an example process 300 for evaluating data quality in association with the data processing system 106. The example process 300 shown in FIG. 3 may be performed by one or more computing systems, such as the computing system shown and described with respect to FIG. 4, that execute the data quality evaluation system 102.

At block 302, execution of the data quality evaluation system 102 can be initiated on one or more computing systems. For example, the data quality evaluation system 102 can begin running based on configuration data 140 associated with the data quality evaluation system 102 that indicates which data quality evaluators 118 to execute, when to execute the data quality evaluators 118, queries and/or types of data 104 associated with the data quality evaluators 118, and/or other configuration information.

At block 304, the data quality evaluation system 102 can identify one or more data quality evaluators 118 to execute. For example, the configuration data 140 may indicate that different data quality evaluators 118 are to be executed at different times, and/or on different types of data 104. As an example, the configuration data 140 may specify that the data error detector 120 should be run on any newly received data 104 as soon as that data 104 is received, indicate that the import anomaly detector 122 should be run at or after deadlines specificized in SLAs 142, and indicate that the pattern anomaly detector 126 should only run once per week. Accordingly, the data quality evaluation system 102 can determine, based on the current time and/or types of data 104 received or processed by the data processing system 106, which of the data quality evaluators 118 are to be executed.

At block 306, the data quality evaluation system 102 can execute the data quality evaluators 118 identified at block 304. The executed data quality evaluators 118 can generate corresponding data quality results 130 at block 308. For example, at block 308 the data quality evaluators 118 can generate data quality results 130 indicating whether the data quality evaluators 118 did and/or did not identify any data anomalies or other data quality issues.

At block 310, the data quality evaluation system 102 can determine whether the data quality results 130, generated at block 308 and/or generated previously, indicate that data anomalies or other data quality issues have been detected by one or more of the data quality evaluators 118. If the data quality results 130 indicate that data anomalies or other data quality issues have been detected (Block 310—Yes), the anomaly notifier 134 can generate corresponding anomaly notifications 138 at block 312. Accordingly, in some examples, anomaly notifications 138 indicative of issues that may be causing data anomalies or other data quality issues can be generated substantially immediately after the data quality evaluators 118 have detected the data anomalies or other data quality issues and have generated corresponding data quality results 130, such that issues that may be causing the data anomalies or other data quality issues can be investigated and fixed based on the anomaly notifications 138.

If data anomalies or other data quality issues are not detected based on the data quality results 130 (Block 310—No), the data quality evaluation system 102 can determine at block 314 whether it is time to generate a data quality scorecard. The configuration data 140 may include schedules indicating when data quality scorecards 136 are to be generated, and/or what types of data 104 and/or metrics are to be evaluated for those data quality scorecards 136. In other examples, user input provided to the scorecard generator 132 or to the data quality evaluation system 102 may request generation of one or more types of data quality scorecards 136. Accordingly, at block 314 the data quality evaluation system 102 can determine whether a data quality scorecard is to be generated at the current time, based on user requests, predefined schedules, or other information.

If it is time to generate a data quality scorecard (Block 314—Yes), the scorecard generator 132 can generate the data quality scorecard at block 316, for instance based on data quality results 130 generated at block 308 and/or any previously generated data quality results 130. The scorecard generator 132 can generate the data quality scorecard as described above with respect to FIG. 2, for example.

If it is not time to generate a data quality scorecard (Block 314—No), or after a data quality scorecard has been generated at block 316, the data quality evaluation system 102 can return to block 304 to identify which data quality evaluators 118 to execute next. As discussed above, configuration data 140 may indicate that different data quality evaluators 118 are to be executed at different times. Accordingly, during a next pass through block 304, the data quality evaluation system 102 may determine to execute different data quality evaluators 118 as the perceiving pass through block 304, such that different types of data anomalies and data quality issues can detected and different types of data quality results 130 can be generated at block 308.

Figure 4:
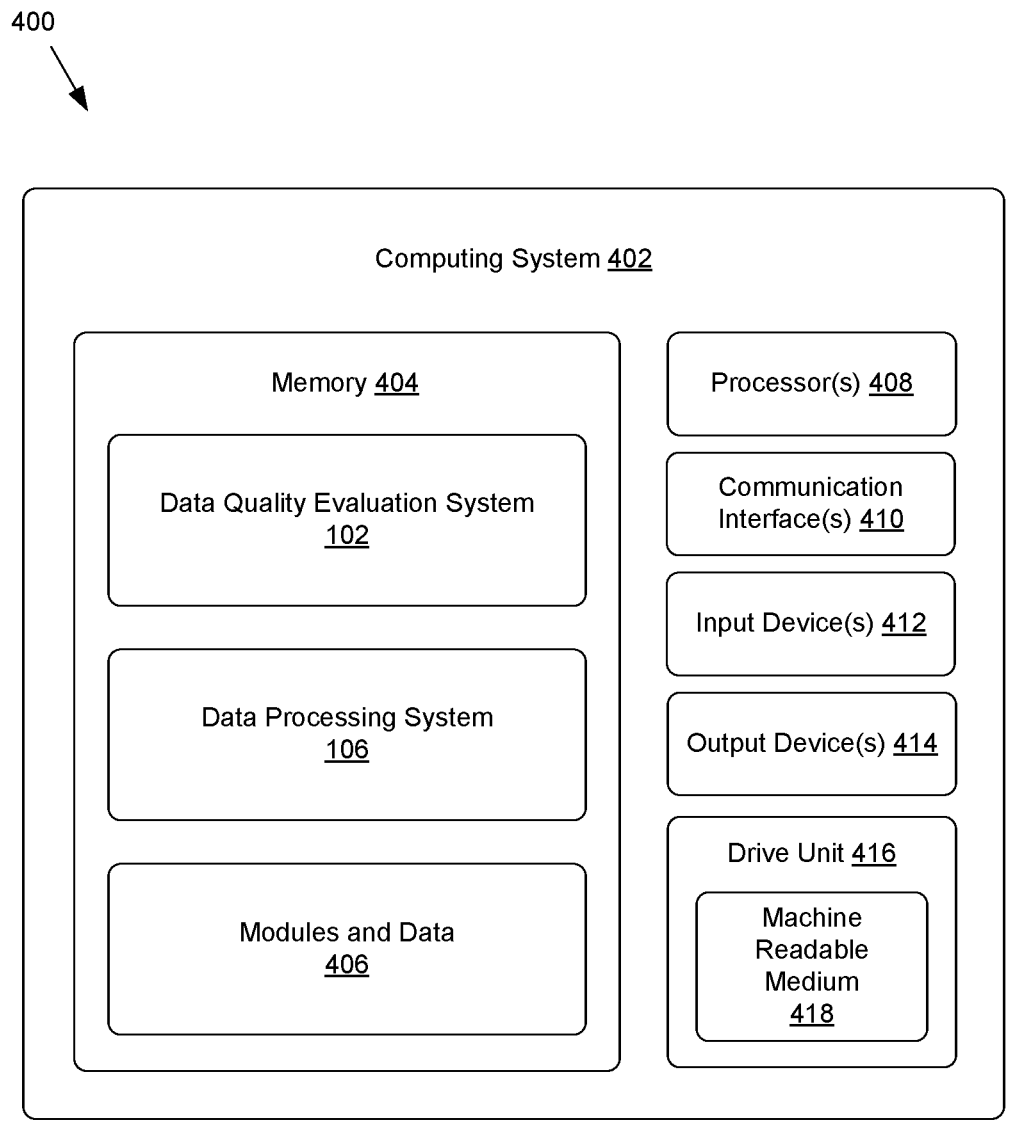
FIG. 4 shows an example system architecture for a computing system associated with the data quality evaluation system.

FIG. 4 shows an example system architecture 400 for a computing system 402 associated with the data quality evaluation system 102 described herein. The computing system 402 can include one or more servers, computers, or other types of computing devices that can execute one or more elements of the data quality evaluation system 102. In some examples, the computing system 402 may also execute one or more elements of the data processing system 106. In other examples, the computing system 402 that executes the data quality evaluation system 102 may be in data communication with one or more other computing systems that execute elements of the data processing system 106, such that the data quality evaluation system 102 can access the data processing system 106 to evaluate data 104 received by and/or processed by the data processing system 106. Such other computing systems that execute elements of the data processing system 106 can have the same, or a similar, system architecture as the system architecture 400 shown in FIG. 4.

In some examples, elements of the data quality evaluation system 102 can be distributed among multiple computing systems. For instance, different computing systems may execute different data quality evaluators 118 of the data quality evaluation system 102. Similarly, in some examples, elements of the data processing system 106 can be distributed among multiple computing systems. For instance, different computing systems may execute different processing stages 110 of the data processing system 106.

The computing system 402 can include memory 404. In various examples, the memory 404 can include system memory, which may be volatile (such as RAM), non-volatile (such as ROM, flash memory, non-volatile memory express (NVMe), etc.) or some combination of the two. The memory 404 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the computing system 402. Any such non-transitory computer-readable media may be part of the computing system 402.

The memory 404 can store data associated with the data quality evaluation system 102, such as computer-executable instructions and/or other types of data associated with one or more of the data quality evaluators 118, the scorecard generator 132, the anomaly notifier 134, the configuration data 140, the SLAs 142, the historical data 114, the validation data 116, the data quality results 130, and/or any other element of the data quality evaluation system 102. The memory 404 can similarly store data associated with the data processing system 106, such as computer-executable instructions and/or other types of data associated with one or more of the processing stages 110, data 104 received from sources 108, data 104 processed by the processing stages 110, and/or any other element of the data processing system 106.

The memory 404 can also store other modules and data 406. The modules and data 406 can include any other modules and/or data that can be utilized by the computing system 402 to perform or enable performing the actions described herein. Such modules and data 406 can include a platform, operating system, and applications, and data utilized by the platform, operating system, and applications.

The computing system 402 can also have one or more processors 408. In various examples, each of the processors 408 can be a central processing unit (CPU), a graphics processing unit (GPU), both a CPU and a GPU, or any other type of processing unit. Each of the one or more processors 408 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processors 408 may also be responsible for executing computer applications stored in the memory 404, which can be associated with types of volatile and/or nonvolatile memory. For example, the processors 408 can access data and computer-executable instructions stored in the memory 404, and execute such computer-executable instructions.

The computing system 402 can also have one or more communication interfaces 410. The communication interfaces 410 can include transceivers, modems, interfaces, antennas, telephone connections, and/or other components that can transmit and/or receive data over networks, telephone lines, or other wired or wireless connections. For example, the communication interfaces 410 can include one or more network cards or other network interfaces that can be used to receive data 104 from sources 108, receive validation data 116 from validation sources, and transmit output 112, data quality scorecards 136, and/or anomaly notifications 138 to one or more destinations.

In some examples, the computing system 402 can also have one or more input devices 412, such as a keyboard, a mouse, a touch-sensitive display, voice input device, etc. The computing system 402 can also have one or more output devices 414 such as a display, speakers, a printer, etc.

The computing system 402 may also include a drive unit 416 including a machine readable medium 418. The machine readable medium 418 can store one or more sets of instructions, such as software or firmware, that embodies any one or more of the methodologies or functions described herein. The instructions can also reside, completely or at least partially, within the memory 404, processor(s) 408, and/or communication interface(s) 410 during execution thereof by the computing system 402. The memory 404 and the processor(s) 408 also can constitute machine readable media 418.

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A computer-implemented method, comprising:
   determining, by one or more processors, and using a data quality evaluation system, an expected amount of data received or processed by a data processing system, wherein:
      the data processing system generates output based at least in part on instances of the data received from one or more sources, and
      the data quality evaluation system determines the expected amount of the data based at least in part on validation data received from one or more validation sources different from the one or more sources;
   determining, by the one or more processors, and using the data quality evaluation system, that an actual amount of the data received or processed by the data processing system differs from the expected amount by more than a threshold degree;
   detecting, by the one or more processors, using the data quality evaluation system, and based on determining that the actual amount differs from the expected amount by more than the threshold degree, a data quality issue associated with the data received or processed by the data processing system, wherein the data quality issue impacts quality of the output generated by the data processing system;
   generating, by the one or more processors, and using the data quality evaluation system, data quality results associated with the data quality issue; and
   generating, by the one or more processors, and using the data quality evaluation system based at least in part on the data quality results, at least one of a data quality scorecard or an anomaly notification.

2. The computer-implemented method of claim 1, wherein the data quality evaluation system further determines the expected amount based at least in part on historical patterns of previous data received or processed by the data processing system.

3. The computer-implemented method of claim 1, further comprising identifying, by the one or more processors, using the data quality evaluation system, and from among a plurality of different sources, a particular source that is causing the actual amount of data to differ from the expected amount by more than the threshold degree.

4. The computer-implemented method of claim 1, wherein:
   the data processing system comprises a plurality of processing stages arranged in a pipeline,
   the method further comprises detecting, by the one or more processors, and using the data quality evaluation system, that a particular processing stage of the pipeline that receives input data is failing to provide expected data to a subsequent processing stage of the pipeline, and
   the data quality evaluation system detects the data quality issue and generates the data quality results based at least on part on detecting that the particular processing stage is failing to provide the expected data to the subsequent processing stage.

5. The computer-implemented method of claim 4, wherein:
the data corresponds with claims associated with a benefit plan and a sponsor, and
the plurality of processing stages, arranged in the pipeline, comprises:
a first processing stage configured to receive the instances of the data from the one or more sources;
a second processing stage configured to adjudicate the claims based on the instances of the data;
a third processing stage configured to at least one of issue bills or make payments based on adjudication of the claims by the second processing stage; and
a fourth processing stage configured to generate, as the output, reports associated with the adjudication of the claims.

6. The computer-implemented method of claim 1, wherein the data quality evaluation system comprises a data error detector configured to detect a second data quality issue by identifying data errors within the data upon receipt of the data or during processing of the data by the data processing system.

7. The computer-implemented method of claim 1, wherein the data quality evaluation system further determines the expected amount based at least in part on service level agreements, with the one or more sources, that define deadlines for the one or more sources to provide the data to the data processing system.

8. The computer-implemented method of claim 1, wherein the anomaly notification indicates an issue with a channel by which the data processing system receives the instances of the data from the one or more sources.

9. The computer-implemented method of claim 1, further comprising determining, by the one or more processors, scores for one or more data quality metrics based on the data quality results, wherein the scores are presented in the data quality scorecard.

10. The computer-implemented method of claim 1, further comprising:
determining, by the one or more processors, scores for one or more data quality metrics based on the data quality results;
determining, by the one or more processors, weights associated with the one or more data quality metrics; and
combining, by the one or more processors, the scores into an overall score based on the weights,
wherein the overall score is presented in the data quality scorecard.

11. The computer-implemented method of claim 1, wherein:
the data processing system is associated with a benefit plan administrator that manages a benefit plan on behalf of a sponsor,
the data is associated with the benefit plan,
the output comprises a report associated with the benefit plan that is generated for the sponsor,
the one or more validation sources comprise at least one of the sponsor or one or more other validation sources, and
the validation data is based on information provided by the one or more sources to the one or more validation sources.

12. The computer-implemented method of claim 1, wherein the validation data is based on information provided by the one or more sources to the one or more validation sources.

13. The computer-implemented method of claim 1, wherein the validation data received from the one or more validation sources comprises a different data type than the data received or processed by the data processing system.

14. One or more computing devices, comprising:
one or more processors; and
memory storing computer-executable instructions that, when executed by the one or more processors, cause the one or more processors to perform operations comprising:
determining, using a data quality evaluation system, an expected amount of data received or processed by a data processing system, wherein:
the data processing system generates output based at least in part on instances of the data received from one or more sources, and
the data quality evaluation system determines the expected amount of the data based at least in part on validation data received from one or more validation sources different from the one or more sources;
determining, using the data quality evaluation system, that an actual amount of the data received or processed by the data processing system differs from the expected amount by more than a threshold degree;
detecting, using the data quality evaluation system, and based on determining that the actual amount differs from the expected amount by more than the threshold degree, a data quality issue associated with the data received or processed by the data processing system, wherein the data quality issue impacts quality of the output generated by the data processing system;
generating, using the data quality evaluation system, data quality results associated with the data quality issue; and
generating, using the data quality evaluation system based at least in part on the data quality results, at least one of a data quality scorecard or an anomaly notification.

15. The one or more computing devices of claim 14, wherein:
the data processing system comprises a plurality of processing stages arranged in a pipeline,
the data quality evaluation system detects that a particular processing stage of the pipeline that receives input data is failing to provide expected data to a subsequent processing stage of the pipeline, and
the data quality evaluation system detects the data quality issue and generates the data quality results based at least in part on detecting that the particular processing stage is failing to provide the expected data to the subsequent processing stage.

16. The one or more computing devices of claim 14, wherein the data quality evaluation system further determines the expected amount based at least in part on service level agreements, with the one or more sources, that define deadlines for the one or more sources to provide the data to the data processing system.

17. The one or more computing devices of claim 14, wherein the anomaly notification indicates an issue with a channel by which the data processing system receives the instances of the data from the one or more sources.

18. One or more non-transitory computer-readable media storing computer-executable instructions that, when executed by one or more processors, cause the one or more processors to perform operations comprising:

determining, using a data quality evaluation system, an expected amount of data received or processed by a data processing system, wherein:

the data processing system generates output based at least in part on instances of the data received from one or more sources, and the data quality evaluation system determines the expected amount of the data based at least in part on validation data received from one or more validation sources different from the one or more sources;

determining, using the data quality evaluation system, that an actual amount of the data received or processed by the data processing system differs from the expected amount by more than a threshold degree;

detecting, using the data quality evaluation system, and based on determining that the actual amount differs from the expected amount by more than the threshold degree, a data quality issue associated with the data received or processed by the data processing system, wherein the data quality issue impacts quality of the output generated by the data processing system;

generating, using the data quality evaluation system, data quality results associated with the data quality issue; and generating, using the data quality evaluation system based at least in part on the data quality results, at least one of a data quality scorecard or an anomaly notification.

19. The one or more non-transitory computer-readable media of claim 18, wherein:

the data processing system comprises a plurality of processing stages arranged in a pipeline, the data quality evaluation system detects that a particular processing stage of the pipeline that receives input data is failing to provide expected data to a subsequent processing stage of the pipeline, and the data quality evaluation system detects the data quality issue and generates the data quality results based at least in part on detecting that the particular processing stage is failing to provide the expected data to the subsequent processing stage.

20. The one or more non-transitory computer-readable media of claim 18, wherein the data quality evaluation system further determines the expected amount based at least in part on service level agreements, with the one or more sources, that define deadlines for the one or more sources to provide the data to the data processing system.

* * * * *